US011593699B2

(12) United States Patent
Bradler et al.

(10) Patent No.: US 11,593,699 B2
(45) Date of Patent: Feb. 28, 2023

(54) APPARATUS AND METHODS FOR GAUSSIAN BOSON SAMPLING

(71) Applicant: Xanadu Quantum Technologies Inc., Toronto (CA)

(72) Inventors: Kamil Bradler, Toronto (CA); Daiqin Su, Toronto (CA); Nathan Killoran, Toronto (CA); Maria Schuld, Durban (ZA); Zachary Vernon, Toronto (CA); Lukas Helt, Toronto (CA); Blair Morrison, Toronto (CA); Dylan Mahler, Toronto (CA)

(73) Assignee: Xanadu Quantum Technologies Inc., Toronto (CA)

( * ) Notice: Subject to any disclaimer, the term of this patent is extended or adjusted under 35 U.S.C. 154(b) by 0 days.

(21) Appl. No.: 17/512,086

(22) Filed: Oct. 27, 2021

(65) Prior Publication Data

US 2022/0051124 A1 Feb. 17, 2022

Related U.S. Application Data

(63) Continuation of application No. PCT/CA2020/050675, filed on May 20, 2020.
(Continued)

(51) Int. Cl.
*G06N 10/00* (2022.01)
(52) U.S. Cl.
CPC .................... *G06N 10/00* (2019.01)
(58) Field of Classification Search
CPC .................. G06N 10/00; G01B 9/00
See application file for complete search history.

(56) References Cited

U.S. PATENT DOCUMENTS 10,649,307 B2 5/2020 Vernon et al.
10,809,592 B2 10/2020 Dutt et al.
(Continued)

FOREIGN PATENT DOCUMENTS

CN 103791845 A 5/2014
EP 3444657 A1 2/2019
JP 2003256668 A * 9/2003

OTHER PUBLICATIONS

Brod et al. "Photonic implementation of boson sampling: a review", Advanced Photonics, May 9, 2019, https://www.spiedigitallibrary.org/journals/Photonic-implementation-of-boson-sampling-a-review/volume-1/issue-03/034001/Photonic-implementation-of-boson-sampling-a-review/10.1117/1 .AP.1.3.034001.full?sessionGUID=9.*
(Continued)

*Primary Examiner* — Li Wu Chang
(74) *Attorney, Agent, or Firm* — Cooley LLP

(57) ABSTRACT

An apparatus includes a light source to provide a plurality of input optical modes in a squeezed state. The apparatus also includes a network of interconnected reconfigurable beam splitters (RBSs) configured to perform a unitary transformation of the plurality of input optical modes to generate a plurality of output optical modes. An array of photon counting detectors is in optical communication with the network of interconnected RBSs and configured to measure the number of photons in each mode of the plurality of the output optical modes after the unitary transformation. The apparatus also includes a controller operatively coupled to the light source and the network of interconnected RBSs. The controller is configured to control at least one of the squeezing factor of the squeezed state of light, the angle of the unitary transformation, or the phase of the unitary transformation.

12 Claims, 9 Drawing Sheets

Related U.S. Application Data

(60) Provisional application No. 62/851,312, filed on May 22, 2019.

(56) References Cited

U.S. PATENT DOCUMENTS

| | | | | |
|---|---|---|---|---|
| 2015/0354938 | A1* | 12/2015 | Mower | B82Y 20/00 356/450 |
| 2016/0156466 | A1 | 6/2016 | Kirby et al. | |
| 2016/0290897 | A1* | 10/2016 | Bakharev | G01N 33/14 |

OTHER PUBLICATIONS

Crespi et al. "Experimental boson sampling in arbitrary integrated photonic circuits", 2012, pp. 4, https://arxiv.org/pdf/1212.2783.pdf.*

Lo et al. "Generalized multimode squeezed states", Physical Revie A, 1993, pp. 733-735.*

Lita et al. ("Superconducting transition-edge sensors optimized for high-efficiency photon-number resolving detectors", SPIE, 2010, pp. 11.*

Miguel et al "Using Gaussian Boson Sampling to Find Dense Graph", PhysRevLett., 2018, pp. 6.*

Huh et al. "Boson Sampling for Molecular Vibronic Spectra", 2014, https://arxiv.org/pdf/1412.8427.pdf, pp. 10.*

Hamilton et al. "Gaussian Boson Sampling", PhysRevLett., 2017, pp. 5.*

Carolan et al. "Universal linear optics", Science, 2015, pp. 5.*

International Search Report and Written Opinion dated Aug. 18, 2020 for International Application No. PCT/CA2020/050675, 7 pages.

First Office Action dated Mar. 23, 2022 for Chinese Application No. 202080037617.4, with English translation, 46 pages.

https://github.com/XanaduAI/strawberryfields; Web page, retrieved on Oct. 15, 2021, 4 pages.

Brádler, K. et al. "Gaussian boson sampling for perfect matchings of arbitrary graphs." Physical Review A, 98:032310 (2018), 17 pages; doi:10.1103/PhysRevA.98.032310.

Killoran, N. et al., "Strawberry Fields: a Software Platform for Photonic Quantum Computing," Quantum, 3:129 (2019); arXiv:1804.03159v1 Apr. 9, 2018, 25 pages.

Sabapathy, K. et al., "Production of photonic universal quantum gates enhanced by machine learning," Phys. Rev. A, 100:012326 (2019); arXiv:1809.04680v2 Sep. 5, 2019, 11 pages.

Dutt, et al., On-Chip Optical Squeezing, Physical Review Applied, Sep. 2013, 8 pages.

Dutt, On-Chip Quantum and Nonlinear Optics from Squeezing to Spectroscopy, Dissertation, Aug. 2017, 210 pages.

Office Action for Chinese Application No. CN20208037617.4, dated Aug. 24, 2022, with English translation, 19 pages.

* cited by examiner

US 11,593,699 B2

APPARATUS AND METHODS FOR GAUSSIAN BOSON SAMPLING

CROSS-REFERENCE TO RELATED APPLICATIONS

This application is a continuation of International Patent Application No. PCT/CA2020/050675, filed May 20, 2020 and titled "Apparatus and Methods for Gaussian Boson Sampling," which claims the benefit of, and priority to, U.S. Provisional Patent Application No. 62/851,312, filed May 22, 2019 and titled "Apparatus and Methods for Gaussian Boson Sampling," the entire contents of each of which are incorporated by reference herein in their entireties.

FIELD

One or more embodiments relate to Gaussian Boson sampling.

BACKGROUND

Algorithms employing universal quantum computation often promise substantially faster computational speeds compared to their classical counterparts. To date, however, no known hardware is capable of running these algorithms on large-scale problems, much less in a fault-tolerant manner.

SUMMARY

Some embodiments described herein relate generally to Gaussian Boson sampling, and, in particular, to performing Gaussian Boson sampling on a photonic platform. In some embodiments, an apparatus includes a light source configured to provide a plurality of input optical modes in a squeezed state of light. The apparatus also includes a network of interconnected reconfigurable beam splitters (RBSs) in optical communication with the light source. The network of interconnected RBSs is configured to perform a unitary transformation on the plurality of input optical modes to generate a plurality of output optical modes. An array of photon counting detectors is in optical communication with the network of interconnected RBSs and configured to measure the number of photons in each mode of the plurality of the output optical modes after the unitary transformation. The apparatus also includes a controller operatively coupled to the light source and the network of interconnected RBSs. The controller is configured to control at least one of the squeezing factor of the squeezed state of light, the angle of the unitary transformation, or the phase of the unitary transformation.

BRIEF DESCRIPTION OF THE DRAWINGS

The drawings primarily are for illustration purposes and are not intended to limit the scope of the subject matter described herein. The drawings are not necessarily to scale; in some instances, various aspects of the disclosed subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

In view of the challenges in realizing universal quantum computation, alternative, non-universal quantum computation models are currently under active research. One such model is Gaussian boson sampling (GBS). A GBS system prepares input squeezed vacuum or squeezed coherent states of a set of quantum harmonic oscillators (e.g., optical field modes) in M modes, inputs them to an N-mode linear optical interferometer, and detects the number of photons in each of the N output modes of the interferometer. In other words, a GBS system samples from the probability distribution of the output in the photon number basis.

Figure 1:
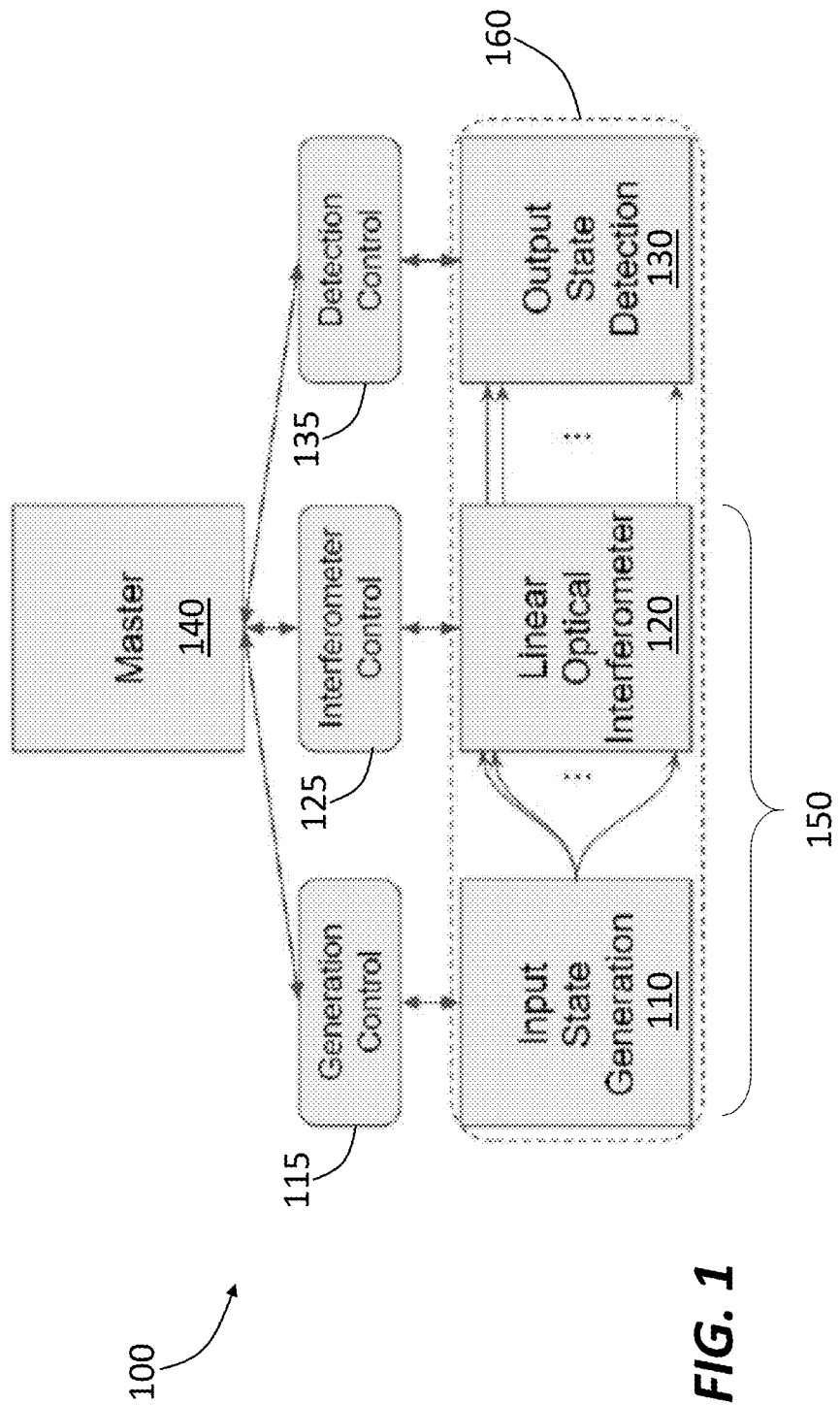
FIG. 1 shows a schematic of an apparatus for Gaussian Boson sampling (GBS), according to an embodiment.

FIG. 1 shows a schematic of an apparatus 100 for GBS, according to an embodiment. The apparatus 100 includes an input state generator 110 to prepare the desired input states of light (e.g., optical modes), followed by a linear interferometer 120 to perform a unitary transformation on the input states of light received from the input state generator 110. A detector 130 is employed to measure the output of the linear interferometer 120 (e.g., output optical modes, also referred to as transformed optical modes). The combination of the input state generator 110 and the linear interferometer 120 is also referred to as a quantum processing unit (QPU) 150, and components within the dashed line is also referred to as quantum hardware (QH) 160.

In addition to the QH 160, the apparatus 100 also includes an input controller 115 to control the operation of the input state generator 110, an interferometer controller 125 to control the operation of the linear interferometer 120, and a detection controller 135 to control the operation of the detector 130. Furthermore, a master controller 140 is employed to coordinate and/or control of the operations of the three controllers 115, 125, and 135. The controllers 115, 125, and 135 can include one or more field-programmable gate arrays (FPGAs), application-specific integrated circuits (ASICs), graphics processing units (GPUs) and/or central processing units (CPUs). The use of FPGAs, ASICs, GPUs and/or CPUs can result in increased operational speed, reliability and flexibility, as well as lower monetary cost, as compared with customized integrated circuits.

In some embodiments, the controllers 115, 125, and 135 can include small computers running drivers to perform control logic and actuate the various subsystem hardware elements. The master controller 140 can include a computer that co-ordinates the control logic of the sub controllers 115, 125, and 135. For example, the master controller 140 can be configured to receive instructions from a user and then send the received instructions to one or more specific sub controllers.

In some embodiments, the input state generator 110 is configured to generate the input states as optical beams or optical pulses (e.g., squeezed light). In these embodiments, the input state generator 110 is also referred to as a light source 110. For example, the input state generator 110 converts laser light and creates, via a nonlinear optical element, a total number M of squeezed and/or displaced squeezed states of light, which can be represented by $\Pi_{i=1}^{M} D_i(\alpha) S_i(r_i) |vac\rangle$, where $D_i(\alpha) = \exp(\alpha a_i^+ - \alpha^* a_i)$, and $$S_i(r) = \exp\left(\frac{r}{2} a_i a_i - \frac{r^*}{2} a_i^+ a_i^+\right),$$

i is the mode number, $r_i$ is the squeezing factor, and $a_i$ is an annihilation operator. In some embodiments, the squeezing factor and displacement in each mode can be independently adjusted so as to encode different applications into the apparatus 100. In some embodiments, the displacement variable α can also be different for each mode, i.e., each mode i has a corresponding displacement $\alpha_i$ in above equations.

The linear interferometer 120 is configured to perform a unitary operation on up to N input modes, and therefore transforms the input mode operator $a_i^+$, with a photon in mode i represented by $a_i^+ |vac\rangle$, to the output mode operator $$\sum_{j=1}^{N} U_{ij} a_j^+,$$

where U is the unitary operator. Different unitary operators $U_{ij}$ can be programmed into the linear interferometer 120 for each run of the QH 160 in the apparatus 100.

The detector 130 in the apparatus 100 has photon counting capability, i.e., the detector 130 is configured to measure the number of photons in each output mode of the linear interferometer 120. Without being bound by any particular theory or mode of operation, each output mode of the linear interferometer 120 can be represented by the projection-valued measure elements $$\prod_i^N = \frac{1}{N_i} (a_i^+)^N |vac\rangle \langle vac| (a_i)^N.$$

The modes i generated by the input state generator 110 (i.e., the state encoding) can correspond to any appropriate set of quantum harmonic oscillator modes. Optical field modes are used here as illustrating examples. In general, an optical field mode can be characterized by frequency/time, polarization, and spatial distribution. Therefore, various encoding schemes can be employed to prepare appropriate optical field modes for the apparatus 100 to perform GBS.

In some embodiments, the input state generator 110 can be configured to generate optical modes using spatial encoding. In these embodiments, different optical modes are characterized by transverse field distributions that do not overlap in space. For example, different optical modes can include separate light beams, which can either propagate in free space or in separate optical waveguides.

In some embodiments, the apparatus 100 can include multiple waveguides to propagate optical modes in spatial encoding. For example, the linear interferometer 120 can include M input ports to receive the M input optical modes, and each port can be coupled to an input waveguide that propagates a distinct input optical mode. In addition, the output modes of the linear interferometer 120 can also be transmitted to the detector 130 via waveguides. In this case, the detector 130 can include an array of photon counting detectors, each of which is coupled to a corresponding output port of the linear interferometer 120 to measure the number of photons in the output optical mode delivered from the output port.

In some embodiments, the input state generator 110 can be configured to generate optical modes using time encoding. In these embodiments, different optical modes are characterized by longitudinal distributions that do not overlap in space. For example, each optical mode can include a well-defined optical pulse in a single longitudinal path.

In some embodiments, the input state generator 110 can be configured to generate optical modes using frequency encoding. In these embodiments, different optical modes are characterized by frequency distributions that do not overlap in frequency, i.e., each optical mode has a distinct frequency or wavelength. In some embodiments, the input state generator 110 can employ more than one encoding scheme to prepare the input optical modes, i.e., using a hybrid scheme.

Figure 2:
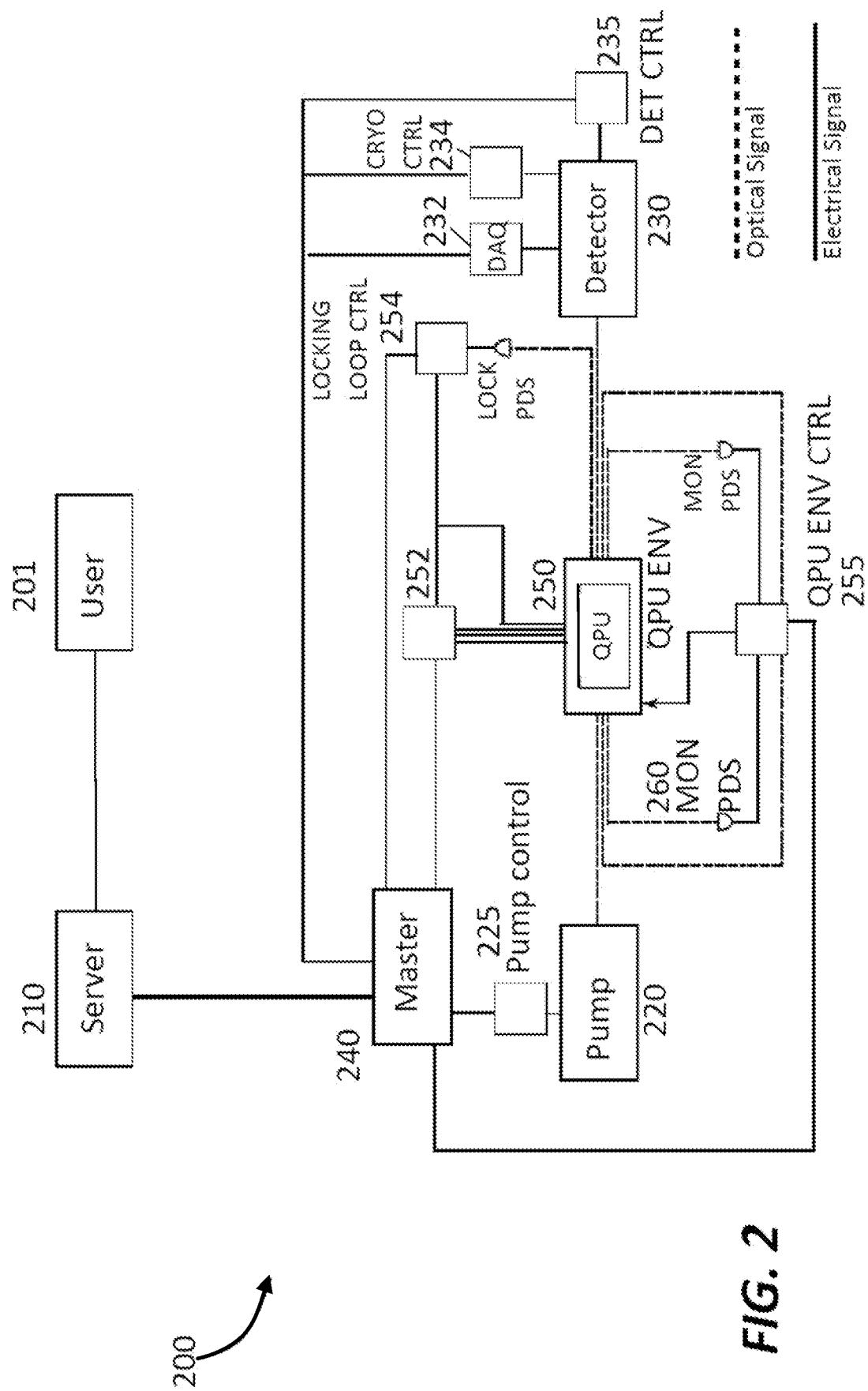
FIG. 2 shows a schematic of a GBS system using spatial encoding, according to an embodiment.

FIG. 2 shows a schematic of a GBS system 200 using spatial encoding, according to an embodiment. The system 200 includes a server 210 for networking the system to a user terminal 201. The user terminal 201 can include any user hardware for accessing the system 200. The access can be realized locally or by internet connection. The system 200 also includes a master unit 240 for controlling the system 200, receiving user instructions, and/or serving status information and computation results to users.

In the system 200, a QPU 250 is used to perform the GBS. The QPU 250 can be substantially similar to the QPU 150 shown in FIG. 1 and described above (e.g., including an input state generator and a linear interferometer). In some embodiments, the QPU 250 can be configured as a photonic chip (see more details below with reference to FIGS. 3-4). A QPU driver 252 is operatively coupled to the QPU 250 for configuring, programming, and operating the elements of the QPU 250. For example, the QPU driver 252 can include a suitable voltage/current driver for on-chip electrical elements (e.g., phase shifters) that are included in the QPU 250. In addition, a locking loop controller 254 is employed for any active feedback systems associated with the QPU 250, such as locking loops for resonant devices. The QPU driver 252 and/or the locking loop controller 254 can include one or more FPGAs, ASICs, GPUs and/or CPUs.

The QPU 250 is also operatively coupled to a QPU environment controller 255, which is configured to control the mechanical, thermal, and/or optical environment of the QPU 250. For example, the QPU environment controller 255 can be configured to ensure that the QPU 250 is operating within a stable environment (e.g., low level of temperature fluctuation, etc.). The QPU environment controller 255 can include one or more FPGAs, ASICs, GPUs and/or CPUs. One or more monitor photodiodes 260 are operatively coupled to the QPU 250 and the QPU environment controller 255 for assessing the stability of the QPU elements. The monitor photodiodes 260 can be configured to measure operation parameters (e.g., optical output) of the QPU 250 and provide the measurement to the QPU environment controller 255 so as to allow the QPU environment controller 255 to generate appropriate control signals.

The system 200 also includes a pump source 220 to provide pump light beams for the input state generator within the QPU 250 to generate the appropriate input states. A pump controller 225 is operatively coupled to the pump source 220 to control the operation of the pump source 220. The pump controller 225 can include one or more FPGAs, ASICs, GPUs and/or CPUs. In some embodiments, the pump source 220 can include a laser.

The output of the QPU 250 is monitored by a detector array 230, which includes a set of photon counting detectors, such as photon-number-resolving transition edge sensors, superconducting nanowire photon counting detectors, and/or avalanche photodiodes. The detector array 230 is controlled by a detection controller 235. For example, the detection controller 235 can adjust the biasing voltage of the detector array 230 so as to improve the detection efficiency. The detection controller 235 can include one or more FPGAs, ASICs, GPUs and/or CPUs. In some embodiments, an optional cryogenic controller 234 can be employed to control the cryogenic system (not shown in FIG. 2) that supports the operation of the detector array 230. A data acquisition system (DAQ) 232 is operatively coupled to the detector array 230 to translate the output signals of the detector array 230 into a series of integers representing photon number readout, which can then be reported to users (e.g., via the user terminal 201).

Figure 3:
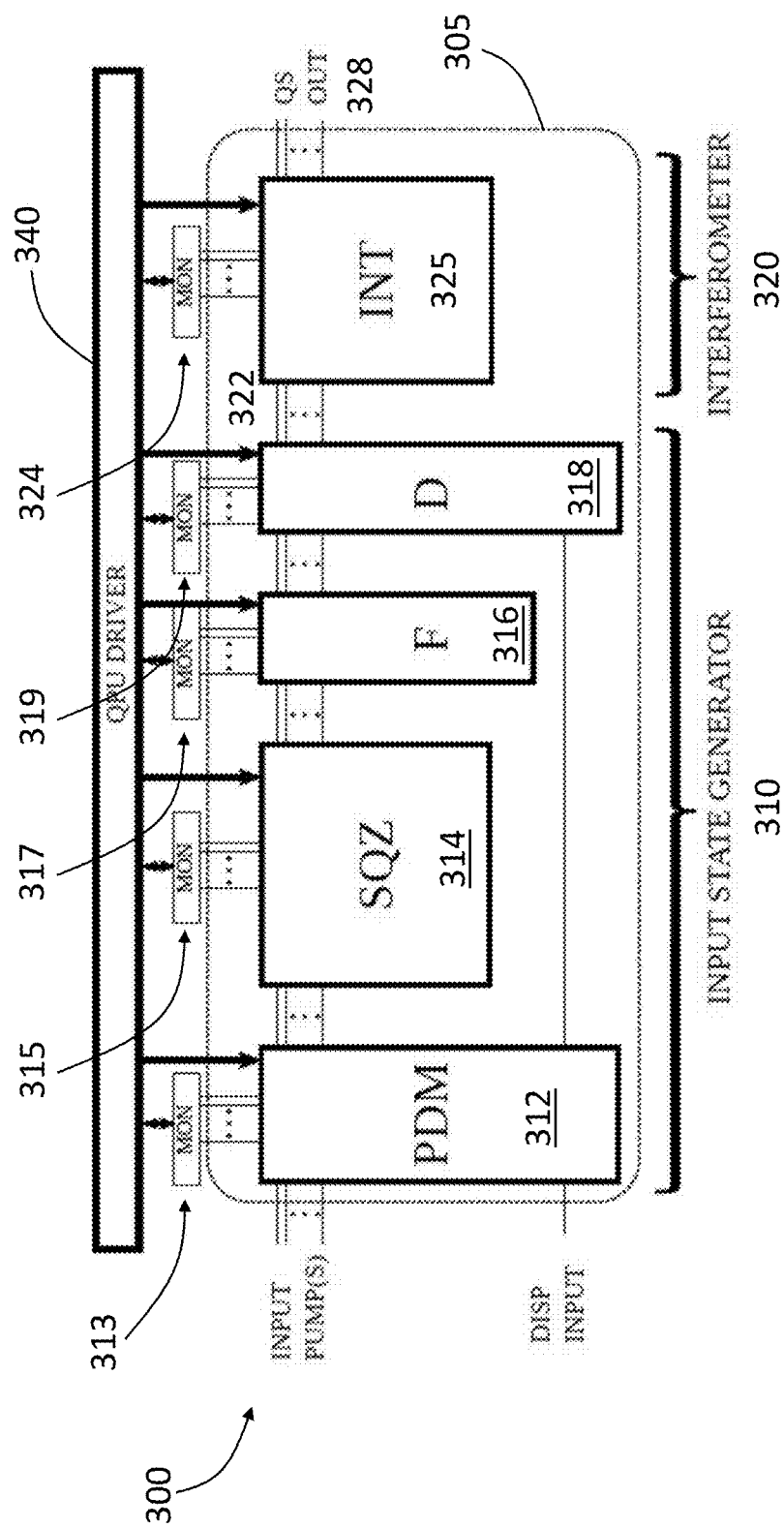
FIG. 3 shows a schematic of a quantum processing unit (QPU) implemented on an integrated photonic circuit to perform GBS, according to an embodiment.

FIG. 3 shows a schematic of a quantum processing unit (QPU) 300 implemented on an integrated photonic circuit to perform GBS, according to an embodiment. The QPU 300 includes an input state generator 310 and an interferometer 320 that are fabricated in a substrate 305 (also referred to as a platform 305). The substrate can include one or more of silicon, silicon oxide (e.g., silicon dioxide), silicon nitride, etc. The input state generator 310 includes a power division module (PDM) 312, a squeezer 314, a filter 316, and an optional displacement module 318 (to generate displaced squeezed light). The interferometer 320 includes input ports 322, a network of RBSs 325 to perform unitary transformation, and output ports 328.

The QPU 300 also includes a QPU driver 340 operatively coupled to the PDM 312, the squeezer 314, the filter 316, the displacement module 318, and the network of RBSs 325 to control their operations. In addition, each of the above elements has a corresponding monitor (e.g., photodetectors and electronics) for monitoring the optical status outputs of that element. More specifically, the PDM 312 is coupled to a PDM monitor 313, the squeezer 314 is coupled to a squeezer monitor 315, the filter 316 is coupled to a filter monitor 317, the displacement module 318 is coupled to a displacement monitor 319, and the network of RBSs 325 is coupled to an interferometer monitor 324. All the monitors 313, 315, 317, 319, and 324 are also operatively coupled to the QPU driver 340. In FIG. 3, thin lines (e.g., between each monitor and its corresponding element) indicate optical signals, and thick lines with arrows (e.g., between the QPU driver 340 and components in the input state generator 310 and the interferometer 320) indicate electrical signals.

The platform 305 can be selected for low optical loss and high index contrast for high confinement of optical modes. Therefore, the resulting building blocks (e.g., waveguides) can be used to construct large-depth optical circuits or circuit elements (e.g., PDM 312, squeezer 314, displacement module 318, or connections between these elements, etc.) where optical modes can propagate a long distance. In some embodiments, the platform 305 includes a silicon-on-insulator wafer that supports optical waveguide structures and integrated photonic components.

In addition to good passive performance, the waveguide material can also possess a high second-order or third-order nonlinear optical response so as to induce efficient parametric fluorescence, which can be employed by the input state generator 310 to generate squeezed light, in some embodiments, the waveguide material can include silicon nitride, silicon nanowire, lithium niobate, and aluminum nitride, among others.

In some embodiments, the QPU 300 can be fabricated using a fabrication platform involving multiple wave guiding layers, which can offer enhanced flexibility in design. For example, nonlinear optical components (e.g., the squeezer 314) can be fabricated on a silicon nitride waveguide layer, and the interferometer 320 can be implemented on a silicon layer. In these embodiments, interlayer couplers can be employed to allow the transfer of light between different layers.

In some embodiments, it can be beneficial to have tunability and programmability in some active components in the QPU 300 (e.g., the interferometer 320). The tunability and programmability can be achieved via electrical inputs from the QPU driver 340. In some embodiments, thermo-optical, electro-optical phase shifters, or any other appropriate type of phase shifters can be integrated alongside the optical waveguide structures so as to realize tunability and programmability.

In the QPU 300, the input state generator 310 is configured to create squeezed and/or displaced squeezed states of light for input into the linear optical interferometer 320. As an input, the state generator 310 converts coherent laser light to drive a nonlinear optical process to produce squeezing and to perform coherent displacements. Generally, squeezers and displacers (e.g., 314 and 318) are pumped by mutually coherent beams, and the PDM 312 is employed to take one or more mutually coherent laser input beams and produce multiple phase locked and mutually coherent output laser beams to drive the squeezer and displacers. The output of the PDM 312 is then directed to the squeezer 314 and displacement module 318.

In some embodiments, the displacement module 318 can be optional, i.e., the input optical modes into the interferometer 320 does not include displacement. In these embodiments, the PDM 312 can be configured to provide an array of high power laser beams to pump the squeezer 314. In some embodiments, the input optical modes into the interferometer 320 includes displaced squeezed light.

In these embodiments, the PDM 312 is configured to provide at least one additional output at lower power for use as a coherent displacement beam. Generally, the wavelength of the pump light beams (i.e., pump wavelength) that drive the nonlinear process to create the squeezed light is different from the wavelength of the resulting squeezed light (i.e., squeezed light wavelength). Accordingly, the wavelength of the displacement beam (i.e., displacement wavelength) is also different from the pump wavelength. In addition, for many mode systems (i.e., large-M system, where M is the number of optical modes), the high optical power demands may make it challenging to receive the entire required quantity of pump light power in a single channel.

In some embodiments, the QPU 300 can include beam splitters to divide the pump beam into multiple separate pump beams (e.g., M pump beams) and can monitor them to provide information on the relative phase between the set of divided input pump beams. The phase information is then made available to the QPU driver 340 to feed back on the relevant input pumps and lock their relative phases. As used herein, a beam splitter (BS) refers to a component that transfers power from two input modes to two output modes via, e.g., a directional coupler or a multi-mode interferometer.

In some embodiments, the beam splitter used can include a reconfigurable beam splitter (RBS), which has tunable power splitting ratios. For example, an RBS can include a Mach-Zehnder interferometer formed from two subsequent beam splitters, with a tunable phase shifter (TPS) in one intermediate arm to provide controllable transmission ratios between four ports. As used herein, a TPS is an element placed adjacent to or in the path of a waveguide that provides a controllable optical phase delay. A TPS can operate thereto-optically or electro-optically (or by any other appropriate mechanism). In general, a TPS can be tuned by an input voltage applied to electrical contacts on the photonic chip that includes the TPS.

In some embodiments, the phase information can be acquired by tapping off a small fraction of each input pump beam upon entry to the PDM 312 with an on-chip beam splitter (e.g., a directional coupler). Each tapped fraction can be interfered with the neighboring tapped fraction via another beam splitter, and the resultant optical outputs of that beam splitter are made available to photodetectors. The information from the signals incident on these photodetectors can be used by the QPU driver 340 to feedback and lock the relative pump input phases. In some embodiments, the feedback is actuated before the pump beams enter into the QPU 300. In some embodiments, the feedback is actuated by TPS units integrated in the PDM 312 via electrical signals from the QPU driver 340.

It is also beneficial for the displacement beam (labelled as "DISP INPUT" in FIG. 3) to be phase stabilized relative to the pump beam(s). Therefore, the PDM 312 can include a monitor to probe this relative phase. Since the displacement wavelength is usually different from the pump wavelength, interfering the displacement beam with the pump beam may not be effective to extract the relative phase information. To address this issue, a separate control beam carried in the same optical channels as the pump beams and displacement beam can be used to probe the relative phase of the displacement beam and pump beams. The wavelength of the control beam is different from any other wavelengths used (including the wavelengths of the pump beams, the displacement beams, and the resulting squeezed light). In addition, the difference between the wavelength of the control beam and the wavelength of the squeezed light can be sufficiently large to facilitate high-extinction filtering of the control beam before detection of the quantum light by the photon counting detectors. Phase information is extracted by interfering the control beams in different channels with one another, and measuring the resulting amplitude of the control beam after interference.

Following this phase locking layer of the PDM 312, the input pump beams are divided to produce balanced output pump beams (e.g., M output pump beams) to drive the squeezer 314. In some embodiments, the division can be realized by a set of beam splitter trees. In some embodiments, the division can be realized by an interferometer network. It is also beneficial to have independent control over the optical power of each output pump beam (e.g., using RBSs) before the pump beam is directed to the squeezer 314.

Depending on the nature of the squeezer 314, the output pump light beams (i.e., light beams that drive the squeezer 314) may be continuous, pulsed, monochromatic, or a combination of one or more continuous and one or more pulsed inputs at different wavelengths. For example, the squeezer 314 may use a strong continuous drive beam and a weak pulsed beam at another wavelength to generate squeezed light. More details of this scheme to generate squeezed light can be found in U.S. Pat. No. 10,649,307, issued May 12, 2020 and titled "INTEGRATED DEVICES FOR SQUEEZED LIGHT GENERATION," which is incorporated herein it its entirety. In this case, the PDM 312 allows bichromatic inputs to be appropriately routed based on the operation of the squeezer 314. If the two distinct wavelength components of the pump beams are carried in separate channels before the QPU, a similar phase stabilization mechanism can be incorporated to provide information on the requisite relative phases.

In some embodiments, the PDM 312 is configured to operate with bichromatic pumps divided among multiple inputs and with a separate displacement beam and control beams in each input. In these embodiments, the PDM 312 operates as follows. First, the PDM 312 receives in separate channels: (i) one or more pump inputs at a first wavelength (continuous or pulsed); (ii) one or more pump inputs at a second wavelength (continuous or pulsed); (iii) one input at a third wavelength in a suitable mode for coherent displacements. A control beam for probing phase displacements co-propagates in any input channel where the propagating beam has a substantially different wavelength than the others.

Then, the PDM 312 acquires information on the relative phases of the inputs. This information can be made available to an external driver (e.g., 340) via photodetection monitors (e.g., 313). The external driver then modulates phase shifters (e.g., within the PDM 312, or prior to the PDM 312) to actuate phase shifts to correct for phase drifts between the various inputs and generate phase locked pump beams. The PDM 312 then divides the phase-locked pumps into an appropriate number of outputs with variable power and directs them to the squeezer 314. The PDM 312 also directs the phase-locked displacement beam to the displacement module 318.

Figure 4A:
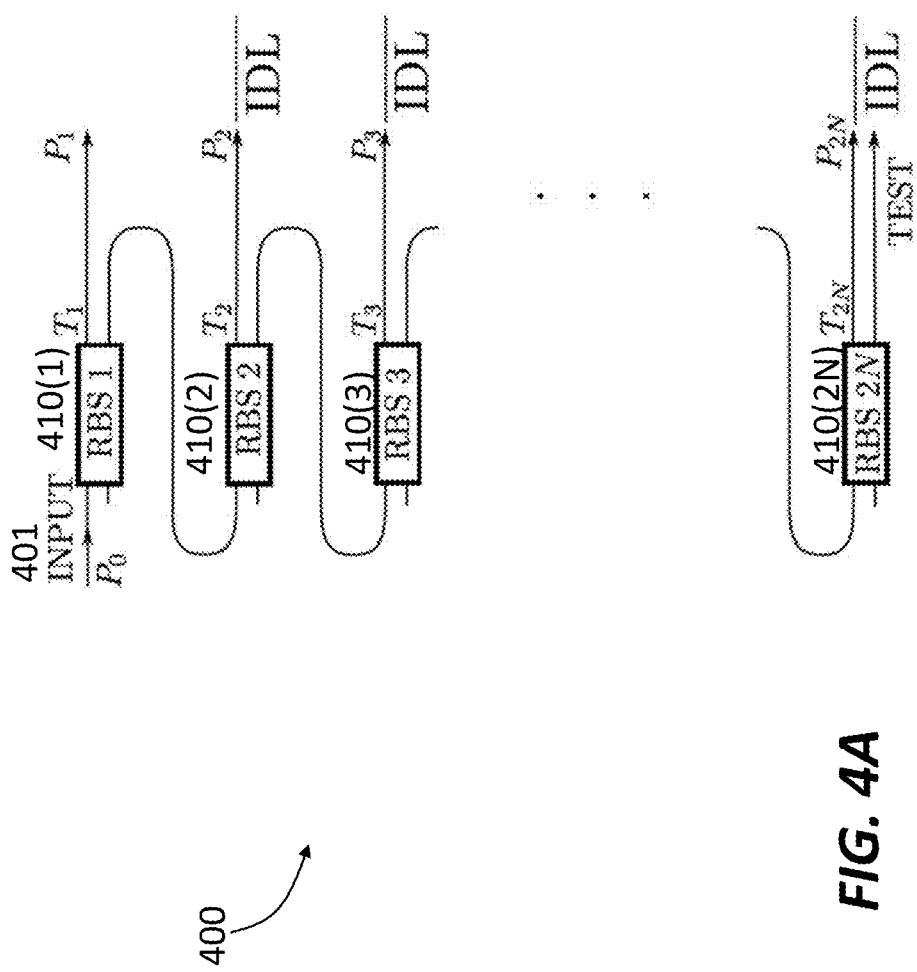
FIGS. 4A-4B show schematics of power division modules that can be used in the QPU shown in FIG. 3, according to an embodiment.

FIG. 4A shows a schematic of a PDM 400 that can be used in the QPU 300 shown in FIG. 3, according to an embodiment. The PDM 400 can divide an input signal 401 arbitrarily into 2N output channels (i.e., $P_1$ to $P_{2N}$ as illustrated in FIG. 4A). The PDM 400 includes 2N RBS units 401(1) to 410(2N) and each RBS unit 410 includes an input port to receive an input signal and two output ports to deliver two output signals. In each RBS 410, the first output port delivers a first output signal to an integrated delay line (IDL) unit, which can delay the phase of the first output signal by a desired amount. These delays can synchronize the array of outputs of the PDM 400. The second output port of each RBS (e.g., 410(N)) delivers a second output signal to the input port of the next RBS (e.g., 410(N+1)), i.e. the second output signal functions as the input signal for the next RBS. For the last RBS (i.e., $RBS_{2N}$), the second output signal can be used as a test channel for calibration.

The transmission ratios of each RBS (i.e., $T_1, T_2, \ldots T_{2N}$) can be controlled by the corresponding phase shifters in each RBS (e.g., the TPS disposed on one arm of the RBS). These RBS units are configured to provide the desired output powers in each channel, which can be determined by the configuration of the PDM 400. For example, odd-numbered output channels can carry pump light to drive the squeezer (e.g., 314 in FIG. 3), and even-numbered output channels can carry light to perform the displacements (e.g., 318 in FIG. 3). That is, the (2j−1)th output for j=1, 2, 3, . . . , N corresponds to the channel that carries pump light for the squeezer element of the jth squeezer-displacer, whereas the (2j)th output corresponds to the displacer input of the jth squeezer-displacer.

The RBS settings to generate a pre-determined sequence of output power fractions can be determined as follows. Suppose that power $P_i$ is at output channel i. Then the input power $P_{in}$ to the PDM (neglecting losses) can be written as:

$$P_{in} = \Sigma_i P_i. \quad (1)$$

The fraction $\alpha_i$ of the total power that emerges from the output of the ith RBS is $\alpha_i = P_i/P_0$; thus the output channel power transmission ratio of the first RBS is $T_1 = \alpha_1$, and the output channel power transmission ratio of the ith RBS (for i>1) is given by:

$$T_i = \frac{\alpha_i}{\sum_{k=1}^{i-1} \alpha_k} \quad (2)$$

In some cases, these ratios ($\alpha_i$) can be adjusted to account for propagation losses. For example, the adjustment of the ratios ($\alpha_i$) can be determined during calibration of the PDM 400. Alternatively, the adjustment of the ratios ($\alpha_i$) can be performed during operation of the PDM 400 in response to, for example, changes of environmental parameters, such as temperature.

For pulsed operation, IDL units can be placed in each channel before the output port to provide suitable temporal delays that balance the optical path lengths of each channel. In this manner, a single input pulse can emerge as a set of temporally synchronized output pulses.

The PDM 400 described herein can be understood as a subset of a directed binary tree, where each RBS corresponds to a node of the tree, and the intervening waveguides correspond to branches that connect them.

Figure 4B:
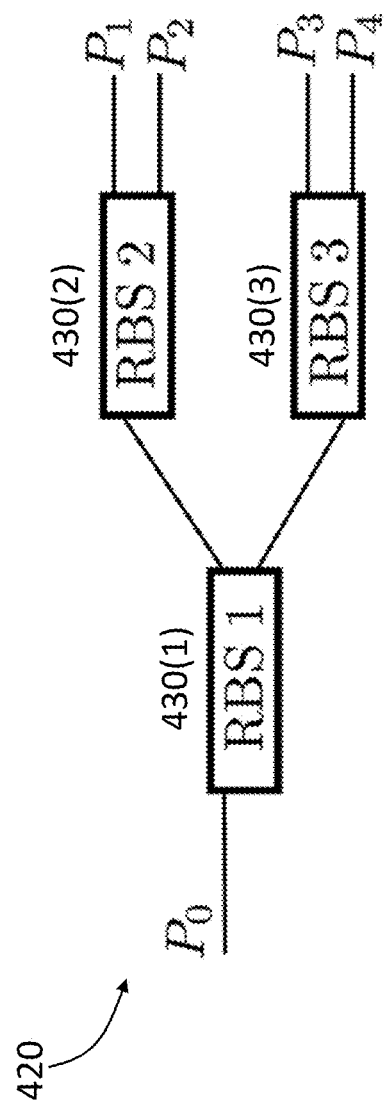

Alternatively, the PDM can be realized by a full binary tree. In this case, the PDM can include a cascade of RBS layers. FIG. 4B shows a schematic of a PDM 420 based on a full binary tree structure. The first layer includes RBS 430(1), and the second layer includes RBSs 430(2) and 430(3). Two layers are shown in FIG. 4B for illustrative purposes. Each layer of RBSs can be split into two channels, until the desired number of output modes is realized. This approach can use fewer RBS units (by approximately a factor of 2 for large N), but may have a greater depth in the horizontal dimension. Depending on the footprint constraint, the PDM may be replaced by such a full-tree system.

Both approaches described above to construct the PDM 400 and 420 use global reconfiguration for each desired output setting. In general, each RBS can be adjusted to change the output power in any channel. While this scheme may add complexity to the control systems, it has the marked advantage of energy efficiency, since all of the input power is used. Accordingly, these approaches are also referred to as power efficient schemes.

Alternatively, another scheme for PDM can use a fixed splitting ratio for each RBS followed by attenuators to control the output, i.e., equal-splitting scheme. This approach may have a simpler control system but some of the input power may be lost during operation (e.g., at the attenuators).

Several factors may influence the decision about which scheme to use. For example, for simulations involving large squeezing levels, large number of modes (e.g., 5-10 modes) in realistic simulations, and large output powers from the PDM, the power efficient scheme is advantageous. In another example, if simplification of the control system is desired, an equal-splitting scheme followed by variable attenuation can also be used.

Referring back to FIG. 3, the squeezer 314 is configured to generate squeezed light with tunable squeezing. In some embodiments, the output of the squeezer 314 includes single mode squeezed states that are degenerate in frequency. In some embodiments, the output of the squeezer 314 includes two-mode or multimode squeezed states by exploiting multiple frequencies, polarizations, or time bins.

Various approaches can be used to generate squeezed light by the squeezer 314. Typically, the squeezer 314 uses a paraffinic interaction in a second-order or third-order nonlinear optical medium to generate squeezed light, i.e., spontaneous parametric down-conversion or spontaneous four-wave mixing. In some embodiments, the squeezer 314 employs a dual-pump scheme to generate squeezed light via spontaneous four-wave mixing in a resonant structure, such as a micro-ring resonator. In some embodiments, the squeezer 314 employs a single pump scheme to generate squeezed light via spontaneous four-wave mixing in a resonant structure. In some embodiments, the spontaneous four-wave mixing can occur in a long waveguide segment (e.g., using either dual-pump or single pump scheme).

In some embodiments, the squeezer 314 can use spontaneous parametric down conversion in a resonant structure (e.g. micro-ring resonator or a system of coupled micro-ring resonators) to generate squeezed light. In some embodiments, the spontaneous parametric down conversion can occur in a phase-matched waveguide segment, or quasi-phase matched periodically poled waveguide segment.

In some embodiments, in each approach of squeezed light generation described herein, auxiliary structure can be included in the squeezer 314 to enhance the properties of the generated squeezed light. For example, in resonant structures (e.g., micro-ring), it is beneficial for the resonances that accommodate the generated squeezed light to have a high escape efficiency (i.e., the efficiency for the generated squeezed light to be coupled out of the resonant structure). This can be accomplished, for example, by strongly overcoupling the corresponding resonance mode with the resonant structure.

The squeezing factor of the output of the squeezer 314 can be adjusted by the QPU driver 340 (e.g., manually by a user or automatically according to certain protocol). In some embodiments, the input pump power can be controlled to deliver a variable amount of optical pump power to each squeezer 314 (e.g., via the settings of the PDM 312). In some embodiments, for resonant squeezers, the detuning of the pump beams away from resonance modes in the resonator can be adjusted to change the squeezing factor. In some embodiments, signals from the QPU driver 340 are employed to actuate on-chip tunable phase shifters, which in turn implement the above adjustments.

In some embodiments, the squeezer 314 also includes monitoring and active feedback for stabilization (especially for resonant squeezer structures). In these embodiments, optical signals that provide information on the status of each squeezer 314 are fed to a set of monitoring photodetectors (e.g., 315), which are in communication with the QPU driver 340. Electrical feedback signals are then carried from the QPU driver 340 to the chip (i.e., components fabricated in the substrate 305) to actuate stabilizing changes, thereby realizing a feedback loop. In some implementations, the optical signals for monitoring can be acquired directly from the squeezer 314. This approach can be used when, for example, the squeezer 314 includes a resonant system where the pump light is carried to and extracted from the squeezer 314 in separate optical channels from the generated squeezed light, in some implementations, the optical signals can be acquired from output ports of the filter 316 as discussed below.

In some embodiments, some or all of the optical pump power for the squeezer 314 is carried away via the same optical channel for the squeezed light. In these embodiments, it can be useful to divert as large a fraction as possible (e.g., about 99% or more) of the pump light before the interferometer 320. Such diversion has at least two benefits. First, the diversion can provide optical information on the squeezer status via the post-squeezer pump light for monitoring and locking. Second, the diversion can reduce or avoid noise generated after the squeezer 314 from unwanted nonlinear effects driven by the pump light, such as spontaneous Raman scattering or four-wave mixing.

In the QPU 300, the diversion of the pump light for the squeeze 314 is accomplished by the filter 316. Various types of filtering mechanisms can be employed to construct the filter 316. In some embodiments, the filter 316 includes one or more add-drop ring filters that are configured to couple out pump light beams while transmitting the squeezed light. In some embodiments, the filter 316 includes asymmetric Mach-Zehnder interferometers (AMZIs). In some embodiments, the filter 316 includes lattice filters (also referred to as cascaded AMZIs). In some embodiments, the filter 316 includes Bragg grating structures. In some embodiments, the filter 316 includes coupled ring structures. In some embodiments, TPS units can be employed to apply biasing for the filter 316.

Figure 5:
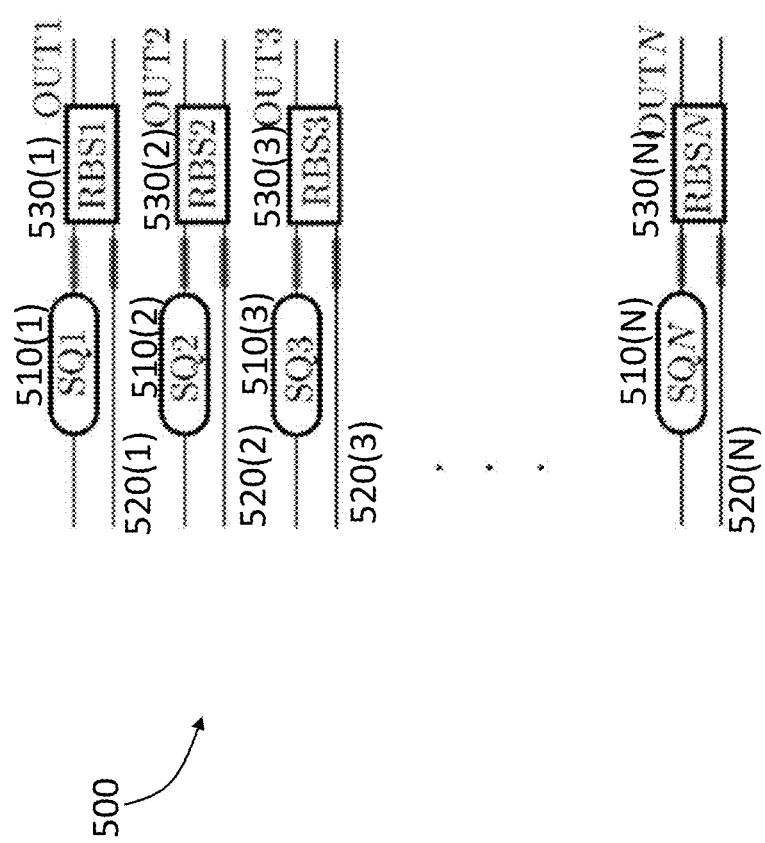
FIG. 5 shows a schematic of a displacement module that can be used to produce displaced squeezed light for GBS, according to an embodiment.

FIG. 5 show schematic of a displacement module 500 that can be used to produce displaced squeezed light for GBS, according to an embodiment. The displacement module 500 can also be used as the displacement module 318 in the QPU 300 shown in FIG. 3. The displacement module 500 includes an array of RBSs 530(1) to 530(N). Each RBS 530($j$) receives a first input beam from a corresponding squeezer 510($j$) and a second input beam (i.e., the displacement beam) 520($j$), where j=1, 2 ... N. The squeezers 510(1) to 510(N) can collectively form the squeezer 314 in FIG. 3.

As illustrated in FIG. 5, displacement can be accomplished by mixing the displacement light beam, provided by a PDM (e.g., the PDM 312 in FIG. 3), with squeezed light provided by the squeezer 314 (e.g., after filter 316). The mixing can be performed on an RBS that is biased close to 100% transmission for the squeezed light. This can avoid adding significant loss to the squeezed light path, while allowing a variable displacement to be made according to the transmission ratio of each RBS as set by the QPU driver. The phase of the displacement beams 520 can be controlled by TPS elements on the input waveguide segments that propagate the displacement beams 520 before the RBSs 530.

Each RBS 530 has two output ports. One port is configured to deliver the displaced squeezed light toward the interferometer (e.g., 320 in FIG. 3). The other port can be configured to provide signals to monitor photodiodes for status monitoring, feedback, and stabilization.

Referring back to FIG. 3, the interferometer 320 can be implemented by a network of beam splitters and phase shifters (e.g., RBSs). The interferometer 320 can include N input ports 322 and N output ports 328 so as to perform a general transformation U(N) on N input optical modes. In some embodiments, N*(N−1)/2 RBSs and N phase shifters can be interconnected via the Reck scheme to construct the interferometer 320. In this scheme, the N*(N−1)/2 RBSs can perform SU(2) transformations and N phase shifters can perform U(1) transformations. Using RBSs to construct the interferometer 320 allows for low losses and a small physical footprint.

The QPU 300 also includes a detector (not shown in FIG. 3). In some embodiments, the detector can also be fabricated on the same platform 305. In some embodiments, the detector can be fabricated on a separate platform and can be removable from the platform 305 (e.g., via fiber coupling).

The detector in the QPU 300 is configured to perform a readout of photon number in each distinct optical mode that is provided by the interferometer 320. In other words, the detector in the QPU 300 has photon number resolution. In some embodiments, the detector can include an array of sensors, each of which is coupled to an output port 328 of the interferometer 320 and generates data corresponding to the number of photons detected in the corresponding output port 328.

In some embodiments, the detector includes transition-edge sensor (TES) detectors. TES detectors can provide accurate photon number resolution with negligible dark counts and high quantum efficiency, which can be beneficial for GBS applications. TES detectors usually operate at low temperatures, e.g., in the mK ranges. Therefore, the TES detectors can be coupled to the interferometer 320 via optical fibers (instead of fabricating the TES detectors on the platform 305). Data acquisition of TES detectors can be accomplished by digitizing the voltage pulses emerging from the detectors and performing suitable computational analysis to resolve the photon number in each pulse and channel. This data acquisition may be triggered by an appropriate timing pulse made available by the QPU control system or input pump subsystem.

In some embodiments, the detector can include any other appropriate type of photon counting detectors, for example single photon counting detectors such as superconducting nanowire single photon counting detectors or single photon-sensitive avalanche photodiodes. In some such embodiments, a suitable multiplexing scheme (e.g., spatial, temporal, or modal multiplexing) can be used to ensure a low probability that more than one photon is incident on any single detector element. Such a multiplexing strategy can involve some multiple number L of detectors, with being a multiple of N and large enough to suppress multi-photon counting events per detector. To ensure that the detectors only detect desired photons, the optical fibers connected to the detectors can include multiple stages of filtering.

The GBS apparatus described herein with reference to FIGS. 1-5 above can be configured such that the output samples (i.e., statistics of photon numbers in each optical mode at the output) contain useful information. A wide array of problems can be encoded into GBS by varying the input squeezing and/or N-mode linear interferometer settings. These problems can be graph-based or combinatorial optimization-based, and have a number of practical applications including social network optimization and chemistry. Output samples from a suitably programmed GBS device can then be used to provide candidate solutions to encoded problems. These samples may be processed by a classical computer, including as part of a hybrid classical-quantum algorithm. The result can further lead to a reconfiguration/update of the GBS device as part of the continuing algorithm.

Figure 6:
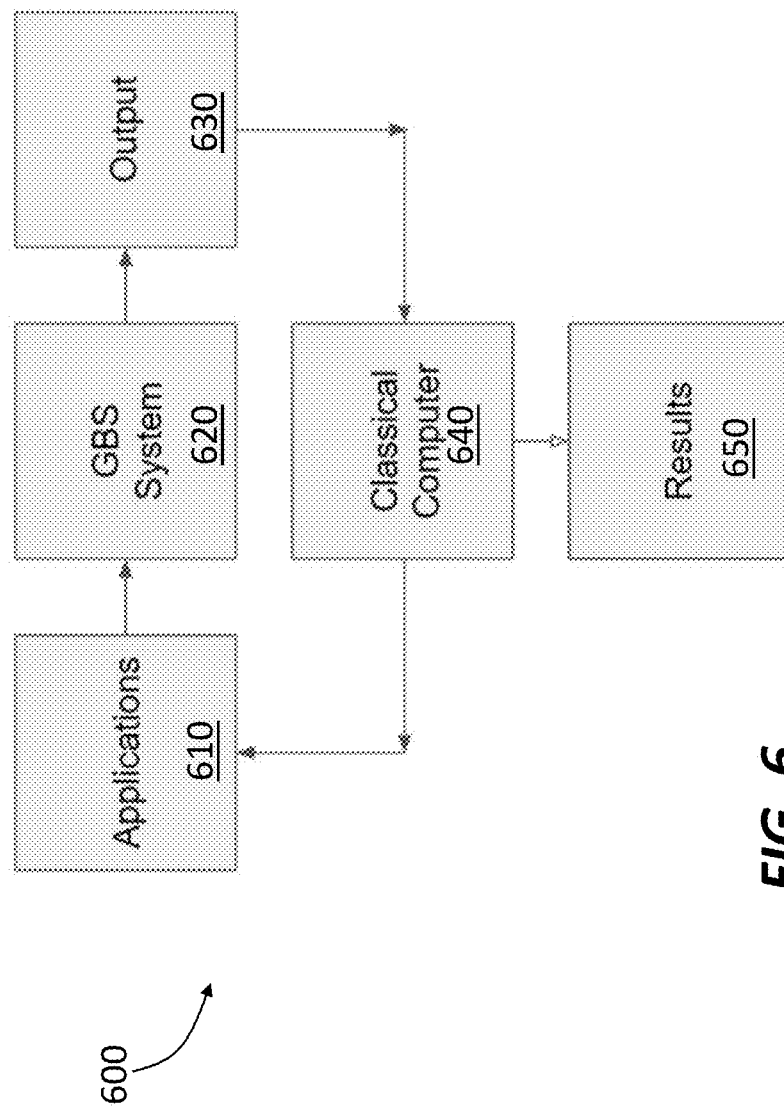
FIG. 6 shows a block diagram to illustrate a method of operating a GBS device, according to an embodiment.

FIG. 6 shows a block diagram to illustrate a method 600 of operating a GBS device, according to an embodiment. The method 100 includes embedding an application 610 into a GBS system 620 (e.g., any of the GBS devices illustrated in and/or described with reference to FIGS. 1-5). For example, the squeezing factor and/or the phase settings of the interferometer in the GBS system can be configured to solve a particular problem (e.g., graph or vibronic spectra as discussed below). The output 630 of the GBS system 620 is then sent to a classical computer 640 (or simply a processor) for post-processing (e.g., analysis of the photon distribution in each optical mode) so as to retrieve solutions 650 of the particular problem embedded in the GBS system 620. In addition, the processed information from the classical computer 640 can be sent back to the application 610 to improve the embedding (e.g., adjusting the input optical modes or phase setting of the interferometer). Exemplary applications that can be embedded in the GBS system 620 include identifying highly connected influencers on a social network, improving the efficiency of solar cells, or reducing the time between when a customer places and receives an online order.

The GBS apparatus described herein can also allow interactions with users, such as setting parameters of the state generation and linear optical interferometer components. To this end, the hardware to execute a GBS-based application can be programmable, i.e., the squeezing parameters, coherent displacement settings (if applicable), and interferometer matrix can be specified and actuated accordingly.

Figure 7:
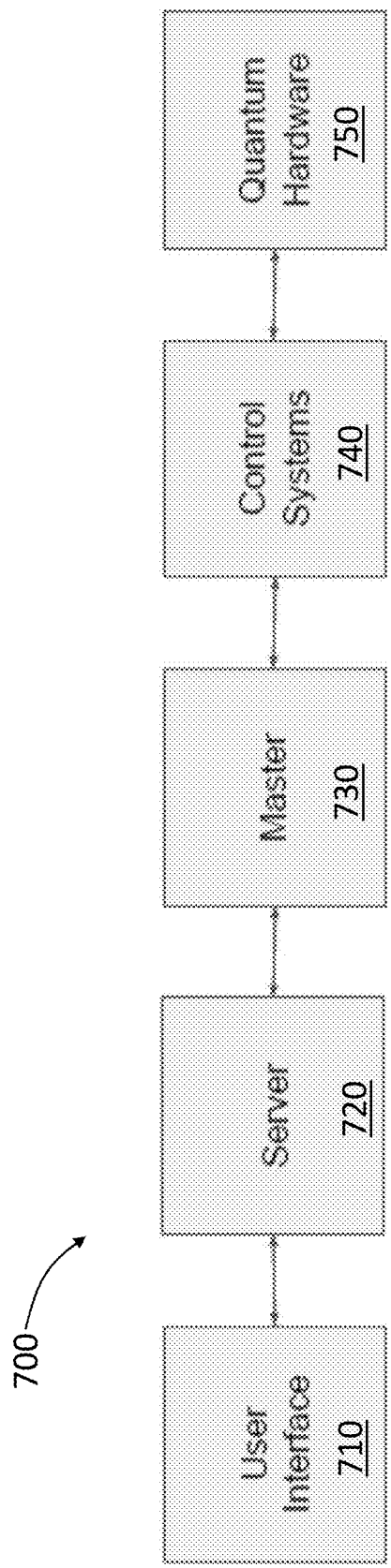
FIG. 7 shows a schematic of a GBS system that provide user access to the setting of the quantum hardware, according to an embodiment.

FIG. 7 shows a schematic of a GBS system 700 that provide user access to the setting of the quantum hardware, according to an embodiment. In the GBS system 700, the hardware elements responsible for input state preparation, interferometer transformation, and output state detection, are henceforth referred to as the quantum hardware (QH) 750 (e.g., similar to the QH 160 in FIG. 1). Parameter setting of QH can be accomplished with a set of classical computers and associated communication interfaces. More specifically, a master unit 730 is dedicated to running, monitoring, and receiving results from the QH 750, via a set of control systems 740. Clients can access the master unit 730 (and thus the QH 750) via a user interface 710. In some embodiments, the user interface 710 is locally connected to the master unit 730. In some embodiments, clients can access the master unit 730 via the internet (i.e., the user interface 710 includes a network interface). In either case, instructions can be passed to the hardware via an application program interface (API). In the internet-access model (also referred to as the cloud access model), clients can communicate with a server 720 via secure web link, which, in turn, communicates with the master unit 730.

As described herein, GBS apparatus and systems as illustrated in FIGS. 1-7 can be used to solve a wide range of problems. Two examples, graph problems and vibronic spectra, are discussed with more details below for illustrative purposes.

Solving problems on graphs is of both theoretical and practical interest due to its applications in computer vision, social networks, and finance. For example, algorithms for graph problems can help identify highly connected influencers on a social network, improve the efficiency of solar cells, and reduce the time between when a customer places and receives an online order. Graph problems may be specified through a graph's adjacency matrix, which can be encoded by varying input squeezing and N-mode linear interferometer settings. In this encoding, each vertex of the graph corresponds to a mode of the device/system in GBS. More details can be found in, for example, Kamil Bradler, Pierre-Luc Dallaire-Demers, Patrick Rebentrost, Daiqin Su, and Christian Weedbrook. Gaussian boson sampling for perfect matchings of arbitrary graphs, *Phys. Rev. A*, vol. 98, page 032310, September 2018, which is incorporated herein in its entirety.

Figure 8:
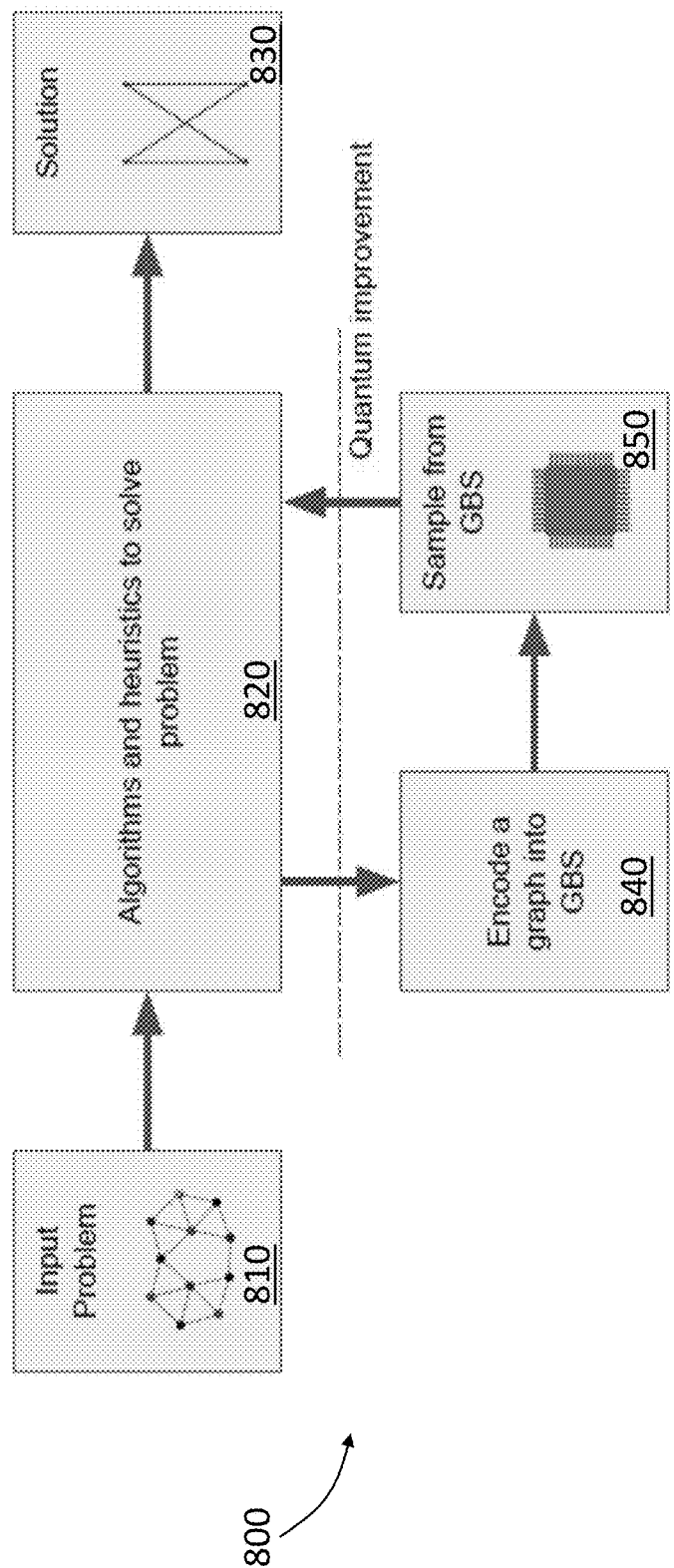
FIG. 8 shows a block diagram illustrating a method of solving graph problems using GBS devices, according to an embodiment.

FIG. 8 shows a block diagram illustrating a method 800 of solving graph problems using GBS devices described herein, according to an embodiment. In the method 800, a graph problem 810 is solved using algorithms and heuristics 820 to reach solutions 830, and a GBS system 850 can be used to improve the solution. More specifically, the graph problem 810 can be first encoded into a GBS system (at 840). Samples are then taken from the GBS system 850 (e.g., any of the GBS system illustrated in and described with reference to FIGS. 1-7) and processed within algorithms and heuristics 820 to help solve graph problems. In some embodiments, the processing include iterative updating of the GBS device based on its output. The GBS model of computation can be adapted within algorithms for finding dense subgraphs and maximum cliques, calculating graph matchings, graph isomorphism, and graph similarity, which are described with more details below.

Identifying subgraphs with high connectivity is a relevant problem in bioinformatics, drug design, data mining, finance, and community detection in social networks. Unfortunately, the computational resources required to find these subgraphs grows rapidly with the size of the graphs. GBS can be employed to randomly generate highly-connected subgraphs with high probability. This feature allows GBS to improve existing classical algorithms that rely on random searches over the space of possible subgraphs.

Classical algorithms often proceed with a mixture of global exploration of the problem space and local searching of candidate solutions, exploiting local structure. Both exploration and local search can involve stochastic elements. For example, choosing a random subgraph as a starting point, or locally searching to build a bigger clique. These stochastic elements are often biased towards selecting highly-connected subgraphs, with the objective of finding improved candidate solutions. A suitably encoded GBS system can then be used as a stochastic source that selects highly-connected subgraphs.

The graph isomorphism problem is a decision problem concerning whether two isospectral graphs (i.e., graphs with the same eigenspectrum) are isomorphic, i.e., whether they are related to each other by a mere relabeling of their vertices. A major open question is whether there exists a polynomial-time algorithm that can determine whether two graphs are isomorphic. In fact, graph isomorphism is likely to belong to the class of NF-intermediate computational problems. A further generalized question concerns how two non-isomorphic graphs (including graphs on different numbers of vertices) are related to each other, i.e., the graph similarity problem. Graph isomorphism, but mainly graph similarity, offers solutions to difficult problems such as computer vision, detecting unusual activities (e.g., fraudulent withdrawals) on financial transaction networks, and the determination of properties of families of molecules e.g., in pharmaceutic, genetics, or biochemistry) without the need for their synthesis.

GBS can be leveraged to yield a complete set of graph invariants, with two graphs being isomorphic if and only if these graph invariants are equal. To this end, the link between graph isomorphism and GBS is first explained. It can be understood by considering cyclic permutations of photon events from GBS. One useful concept is the orbit representative, which acts as a seed event to describe all permutationally equivalent events forming orbits. For example: the orbit of (0, 0, 1, 2) describes the possible events (0, 1, 2, 0), (2, 1, 0, 0), and so forth. These events can be associated with output samples (also referred to as click patterns) from a GBS device, with each orbit having a corresponding GBS probability. The orbit probability can be found for two separate graphs and compared. If the orbit probabilities differ, it is sufficient to conclude that the two graphs are not isomorphic.

An implementation of this scheme can proceed by encoding two graphs on a GBS device as discussed above and evaluating the probability of a given orbit by taking multiple samples from the GBS device. In some embodiments, the graphs can be encoded into the GBS device sequentially, i.e., evaluating the orbit probability for one graph, and then evaluating for the other. In some embodiments, the graphs can be encoded into the GBS device alternately, i.e., taking samples from one graph and then the other, updating their orbit probabilities continuously. Enough samples can be taken such that their orbit probabilities do not overlap when experimental uncertainties are also considered. This can be helpful to conclude that two graphs are non-isomorphic.

To describe the application of GBS for the graph similarity problem, it is also helpful to link GBS orbits with two concepts in graph theory: k-matching and the matching polynomial. A k-matching in a simple (i.e., undirected and loopless) graph on 2M vertices is the number of k independent (disjoint) edges of the graph. By definition, $1 \leq k \leq M$. The k-matchings are the coefficients of the graph matching polynomial. Calculating the matching polynomial can be a challenging computational problem that becomes intractable for traditional computers when M is sufficiently large. In fact, there is no known efficient traditional algorithm to even approximate the matching polynomial, except for certain special classes of graphs.

A GBS device can be used to estimate the matching polynomial via the use of the GBS polynomial. The GBS polynomial is of the same order as the matching polynomial and its coefficients are related, but not identical, to the graph's k-matchings. Some of the terms (also referred to as coefficients) of the GBS polynomials can be efficiently estimated using the GBS device and, moreover, the GBS polynomial is more suitable for the graph isomorphism or similarity problem than using the information one can get from the graphs' matching polynomials.

The GBS polynomials can be extracted from the output of a GBS device as follows. An output click pattern of a (IBS device is referred to as collision-free if at most one photon is detected at each output mode. When a graph is encoded in a GBS device, it can be shown that the probability of observing a collision-free orbit with 2 k photons is equal to the k-th coefficient of the GBS polynomial. The important aspect of sampling orbits with 2 k photons is that this is tractable for some k. This is because the number of collision-free orbits grows merely polynomially with the encoded graph size 2M. Since the orbit probabilities are graph invariants, they provide an efficient way for GBS to decide whether two graphs are isomorphic.

The extension to graph similarity is given by considering the full range of possible orbits given with a fixed total photon number. This takes the problem out of the no collision regime and accordingly one has to correspondingly generalize the GBS polynomial insight. Higher order probability distributions include a combination of different orbit probabilities. These coarse-grained probability distributions are coefficients of another GBS polynomial, which corresponds to an extended graph obtained by tensoring the original graph with a complete graph with self-loops.

There are three aspects to the above process. First, the more coarse-grained the probability distributions, the easier it is to use a GBS device to sample from them. Second, the tensoring procedure can amplify the differences between two graphs. It is the comparison of the extended GBS polynomial coefficients that makes it so suitable for the graph similarity problem. Taking coarse-grained orbits with higher photon numbers can obtain more refined information about the difference between two graphs. Finally, these insights lead to a comparison of the matching polynomials (as if one has access to them) and the GBS polynomial and in alt cases it turns out that the GBS polynomial reveals the dissimilarity of two graphs for a lower number of detected photons. This last point suggests that the GBS polynomial can be more powerful than the matching polynomial for this type of problems and this has ramifications for the experimental implementations of the algorithm.

A GBS scheme that can be even more suitable for the graph similarity problem includes initial uniformly displaced squeezed states entering the linear interferometer encoding the graph. The considered regime can be both collision-containing or collision-free. The comparison of the detected click patterns and their coarse-grained versions leads to a measure of similarity for the encoded graphs. In general, with or without a displacement, evaluating the orbit distribution through GBS allows a user to associate an encoded graph with a feature vector populated with the probabilities of orbits. This association can be understood as an embedding of a graph into real space using GBS, which can be used to formulate a graph kernel. Graph kernels and feature vectors can be used within the scope of machine learning, such as for classification and regression. This concept can be extended to a form of classification or clustering of graphs, using methods such as support vector machines and k-means clustering.

Based on the descriptions above, a GBS-based solution to a graph problem (e.g., graph isomorphism or similarity problem) can be carried out as follows. First, a graph is made GBS-encodable by converting the graph into a Gaussian covariance matrix. The Gaussian covariance matrix is used to find the squeezing parameters and the unitary angle and phase values for the linear interferometer in the GBS device. Optimized vacuum displacement values are found for the displacement-based version of the setup. Then, the statistics of the click patterns is collected from the detectors in the GBS device. The coarse-grained statistics are then obtained by classical post-processing. Orbit probabilities are estimated in the collision or collision-free regime. They are interpreted as the coefficients of the GBS polynomial of the graph or its tensored extensions.

Next, for the graph isomorphism problem, the difference in the estimated GBS polynomial coefficients is used to conclude that two graphs are not isomorphic. For the graph similarity problem, the relevant estimated GBS polynomial coefficients are associated with the feature vectors and processed in the machine learning layer to find how similar two graphs are. For example, the feature vectors are processed by a classical computer running a machine learning algorithm, such as a neural network or a kernel machine, among others. Finally, the decision problem or the similarity measure can be reported to the user.

Effectively modeling molecular vibronic spectra is useful for understanding and engineering chemical reactions for both academic research and industrial purposes. Accurately predicting the structure of molecular vibronic spectra can be a computationally intensive task and usually involves prohibitively large computational resources as the molecules to be targeted grow in size and complexity. A strategy to perform these calculations efficiently would therefore represent an important step forward for chemical simulation.

A GBS system enables such a strategy by exploiting a connection between the dynamics of vibrational modes and quantum optics. For a molecule with n vibrational modes, the GBS strategy involves the preparation of n displaced squeezed states, an n×n linear optical interferometer, and photon number resolved detection in the output modes. In all cases above the associated GBS algorithm scales better than any known classical algorithm in computational resources, and/or the number of calculation steps, with the size of the problem.

In a GBS-based approach to solve vibronic spectra problems (e.g., the system shown in FIG. 7), a client can first communicate with a server via a secure web link, using an appropriate graphical or command-line user interface, or custom application program interface (API). The information transmitted to the server by the client describes the molecular structures to be simulated. These molecular structures are encoded as physical parameters (e.g., optical powers, beam splitter ratios, and phases) by an interpreter, which can include software running on a conventional computer. The interpreter passes these physical parameters to a control system, which includes auxiliary drivers that directly communicate with the quantum hardware. The quantum hardware includes the optical chips and photon counting detectors. The outputs from these detectors are fed to software running on a decoder, which parses the photon counting distribution into a usable representation of the vibronic spectra. This information is passed back to the server, which communicates the results of the calculations back to the client.

In some embodiments, the client access model shown in FIG. 7 can use the molecular coding scheme described in Huh et al., *Boson sampling for molecular vibronic spectra*, Nature Photonics 9, 615 (2015), which is hereby incorporated by reference in its entirety. The interpreter uses this encoding scheme to translate the vibronic transition to be simulated into a set of parameters, including beam splitter ratios and phases for the interferometer, squeezing factors and displacements to be implemented by the squeezer/displacer. In systems described herein, these parameters can be controlled on-chip by phases in each module. Thus, the interpreter ultimately instructs the control system what phases to set in each module. The control system converts this to a set of voltages to apply to the phase shifters.

For the decoding, the photon counts measured by the detectors can form precisely the probability distribution that makes up the set of Franck-Condon (FC) factors that can be used to reconstruct the vibronic spectra. So, the decoder can take this photon counting distribution, compile it into a set of FC factors, and report the result back to the client via the server.

In addition to solving graph problems and modeling vibronic spectra, GBS systems described herein can also be used as point processes. Without being bound by any particular theory or mode of operation, point processes are statistical models for generating and interpreting random point patterns that might appear in nature, technology, and human affairs. Matrix function point processes are a class of point processes in which the probability of observing a specific point pattern depends on matrix functions such as determinants and permanents. Determinantal point processes can be applied to various problems in machine learning including text summarization, human pose estimation and news threading. Point processes that depend on permanents or hafnians, however, have not been broadly used due to the computational difficulties associated with the calculation of these matrix functions on classical computers.

A GBS machine can be considered as a point process that generates random point patterns in the form of photons in certain optical modes. The probabilities of patterns generated by GBS are proportional to the hafnian of the matrix that specifies the GBS settings. Accordingly, a GBS machine can be programmed to generate point patterns that inherit the typical features of hafnian and permanental point processes. As a result, GBS overcomes the difficulties associated with the application of hafnian and permanental point processes on classical computers. Two examples of the GBS point process, among others, are provided in the following.

One feature of the GBS point process is the higher probability of point patterns that are locally clustered. This intrinsic clustering property of GBS can be used in tasks such as portfolio optimization and machine learning. One aspect of the portfolio optimization is to diversify assets in order to avoid having highly correlated stocks in one portfolio. The GBS machine can be programmed with the stock covariance matrices obtained based on the time correlation of stock properties such as market prices. This GBS point process is able to detect highly correlated stocks and thus helps to provide well-diversified and stable portfolios. The GBS point process can also be combined with classical algorithms to increase the efficiency of classical machine learning clustering methods. In particular, the GBS point process can be used to provide more realistic cluster centers used to initiate classical clustering algorithms such as k-means.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

As used herein, a "module" can be, for example, any assembly and/or set of operatively-coupled electrical components associated with performing a specific function, and can include, for example, a memory, a processor, electrical traces, optical connectors, software (stored and executing in hardware) and/or the like.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus, comprising:
   a light source configured to provide a plurality of input optical modes in squeezed states of light;
   a network of interconnected reconfigurable beam splitters (RBSs) in optical communication with the light source, the network of interconnected RBSs configured to perform a unitary transformation of the plurality of input optical modes to generate a plurality of output optical modes;
   an array of photon counting detectors in optical communication with the network of interconnected RBSs, the array of photon counting detectors configured to measure a number of photons in each output optical mode from the plurality of the output optical modes after the unitary transformation; and
   a controller operatively coupled to the light source and the network of interconnected RBSs, the controller configured to dynamically adjust a squeezing factor of the squeezed states of light and to perform at least one of tuning an angle of the unitary transformation or tuning a phase of the unitary transformation to represent an adjacency matrix of a graph, each input optical mode in the plurality of input optical modes representing a vertex of the graph.

2. The apparatus of claim 1, wherein the squeezed states of light include a displaced squeezed state of light.

3. The apparatus of claim 1, wherein the light source includes:
   a power division module (PDM) to receive an input optical beam and divide the input optical beam into 2N PDM beams, where N is a positive integer; and
   a squeezer-displacer module (SDM), in optical communication with the PDM, to receive the 2N PDM beams and generate the plurality of input optical modes having N squeezed light beams.

4. The apparatus of claim 1, wherein the network of interconnected RBSs includes an array of input ports to guide the plurality of input optical modes into the network of interconnected RBSs and an array of output ports to send the plurality of output optical modes into the array of photon counting detectors.

5. The apparatus of claim 1, wherein the array of photon counting detectors includes an array of transition-edge superconducting detectors.

6. The apparatus of claim 1, further comprising:
   a substrate including at least one of silicon, silicon oxide, or silicon nitride, the light source and the network of interconnected RBSs being fabricated in the substrate.

7. The apparatus of claim 1, further comprising:
   a processor operatively coupled to the array of photon counting detectors and configured to find dense subgraphs within the graph based on the number of photons in each output optical mode from the plurality of the output optical modes after the unitary transformation.

8. The apparatus of claim 1, further comprising:
   a processor operatively coupled to the array of photon counting detectors and configured to calculate (1) graph invariants for determining a graph isomorphism, and (2) a GBS polynomial for use in one of determining the graph isomorphism or determining a graph similarity, based on the number of photons in each output optical mode from the plurality of the output optical modes after the unitary transformation.

9. The apparatus of claim 1, further comprising:

a processor operatively coupled to the array of photon counting detectors and configured to evaluate a graph isomorphism based on the number of photons in each output optical mode from the plurality of the output optical modes after the unitary transformation.

10. The apparatus of claim 1, further comprising:

a user interface operatively coupled to the light source and the network of interconnected RBSs, the user interface configured to receive information about a molecular structure provided by a user; and an interpreter, operably coupled to the user interface, to generate a control signal based on the information about the molecular structure, the controller being configured to cause the light source to generate the plurality of input optical modes in response to the control signal.

11. The apparatus of claim 1, further comprising:

a decoding unit operably coupled to the array of photon counting detectors and configured to transform an array of detection signals acquired by the array of photon counting detectors into a representation of molecular vibronic spectrum.

12. The apparatus of claim 1, further comprising:

a silicon nitride substrate, the light source and the network of interconnected RBSs being fabricated in the silicon nitride substrate.

\* \* \* \* \*